March 13, 1973 YOUN H. TING 3,720,807

FOOD WARMING APPARATUS

Filed May 5, 1972 4 Sheets-Sheet 1

United States Patent Office 3,720,807
Patented Mar. 13, 1973

3,720,807
FOOD WARMING APPARATUS
Youn H. Ting, Attleboro, Mass., assignor to Texas Instruments Incorporated, Dallas, Tex.
Filed May 1, 1972, Ser. No. 248,827
Int. Cl. F27d 11/02
U.S. Cl. 219—441
12 Claims

ABSTRACT OF THE DISCLOSURE

A food warmer comprising a tray portion having several compartments mounts a heater assembly in heat transfer relationship with some but not necessarily all the compartments. The heater assembly comprises a heat transfer plate of thermally and electrically conductive material to which is secured a wafer of positive temperature coefficient of resistance material. The wafer is provided with an electrically conductive coating on its two opposite faces. An electrically conductive spring is mounted by an eyelet on a saucer-like cover of electrically insulative material. The spring is biased into electrical contact with the wafer with the cover clamped in place on the heat transfer plate by a plurality of tabs. Electrical connection is made to the heat transfer plate and to the eyelet to provide a current path through the wafer. A ring of heat shrinkable material is shrunk around the periphery of the wafer to increase the effective electrical distance between the two faces of the wafer.

---

This invention relates to heating apparatus and more specifically to heating apparatus particularly suitable for use with food warming trays.

Food warming apparatus has been found to be very useful in many situations. For instance, when used for baby food it is maintained at an optimum temperature even though considerable time may be consumed for a typical feeding.

Heretofore such apparatus has typically employed a standard resistance heater coupled with a thermostat to regulate the heat generated. Thus the temperature of the heater would cycle between two limits with the thermostat turning the current on and off. This over and under shoot from the desired temperature is undesirable not only due to the varying temperature of the food being warmed but also due to the electrical noise created which can cause interference with radio equipment as well as shortening the useful life of the apparatus due to moving parts. Yet another disadvantage is that this combination of heater and thermostat is inherently relatively expensive and the heater relatively inefficient with heat concentrated in localized areas.

Briefly, the above disadvantages of the prior art are obviated by the present invention by employing a wafer of positive temperature coefficient of resistance material in thermal communication with a relatively large heat transfer plate having low thermal storage characteristics but high heat conductivity. Heat generated in the wafer is conducted away from the wafer thus keeping it in a low resistance state for an extended period of time until the temperature of the tray and food contained therein increases. The wafer is metallized on opposite faces and cemented to the heat transfer plate. A saucer shaped cover of insulative material is placed over the wafer and kept in assembled relation by a plurality of tabs in the heat transfer plate. An electrically conductive spring is mounted within the cover and biased against a face of the wafer. An electrical circuit is made from the heat transfer plate through the wafer and spring to an electrical lead connected to the spring. The heat transfer plate is adhesively attached to the bottom wall of the food warming tray coextensive with the area which is desired to be heated.

Self regulating heaters composed of positive temperature coefficient of resistance have come into use within the last few years. An example of such a heater is contained in U.S. Patent No. 3,489,976 issued Jan. 13, 1970 to the assignee of the instant invention. In this patent a PTC heater such as a doped barium titanate is used in a relay device. This heater is self-limiting and thus needs no device for controlling the amount of current it receives. Use of such a heater in food warmer appliances would overcome many of the disadvantages mentioned above in reference to the standard resistance-thermostat combination in that it would have no over and under shoot cycling, no moving parts and concomitantly longer life and lower cost. However, one of the characteristics of such heaters is that like most ceramics they are poor heat conductors. When it is desired to raise the heater to a particular temperature for control purposes this does not constitute a particular problem; however, a problem is presented when it is desired to maximize heat generation to heat a comparatively large load, such as the contents of a food tray since once the PTC heater goes into a high resistance state the heat generated is significantly reduced.

Thus it is an object of the present invention to provide food warming apparatus in which a PTC heater is efficiently utilized therein. Another object is the provision of apparatus to increase the heat output or generation of a PTC heater. Yet another object is the provision of such apparatus which is easily produced and assembled at minimal cost.

Additional objects and features of the invention will be apparent from the following description in which the presently preferred embodiment is set forth in detail in conjunction with the accompanying drawings.

Similar reference characters indicate corresponding parts throughout the views of the drawings.

Figure 1:
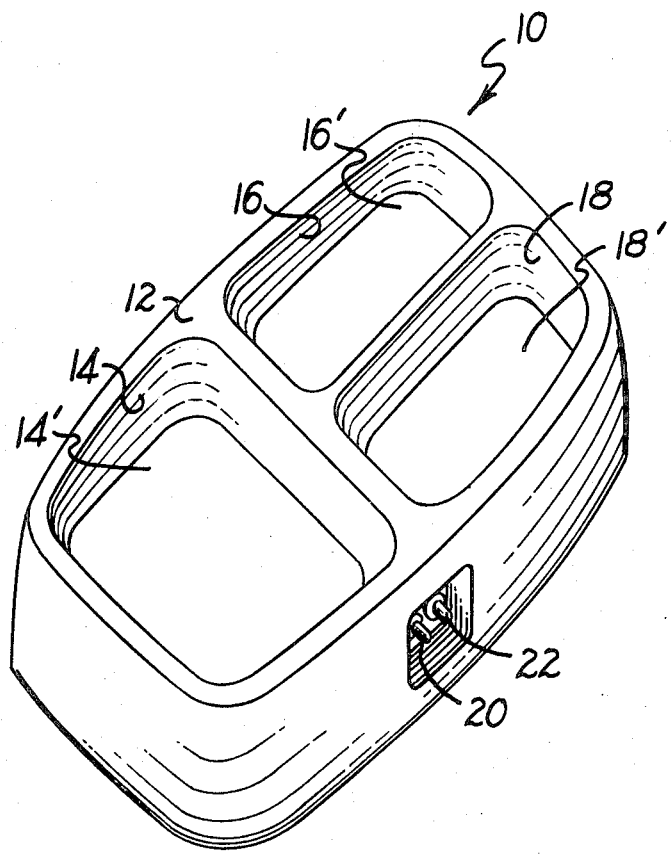
FIG. 1 is a pictorial view of a food warming tray utilizing the improved heater unit of the present invention.

Dimensions of certain of the parts as shown in the drawings may have been modified or exaggerated for the purpose of clarity of illustration.

FIG. 1 shows an exemplary food warming tray 10 comprising a base 12 defining a plurality of compartments 14, 16, 18 having bottom walls 14′, 16′ and 18′ respectively. Although three compartments are shown, it will be understood that it is within the purview of the invention to provide any desired number including a single flat surface. Terminals 20, 22 provide means for electrically connecting a heater unit 24 mounted within the base to an electrical power source.

Figure 2:
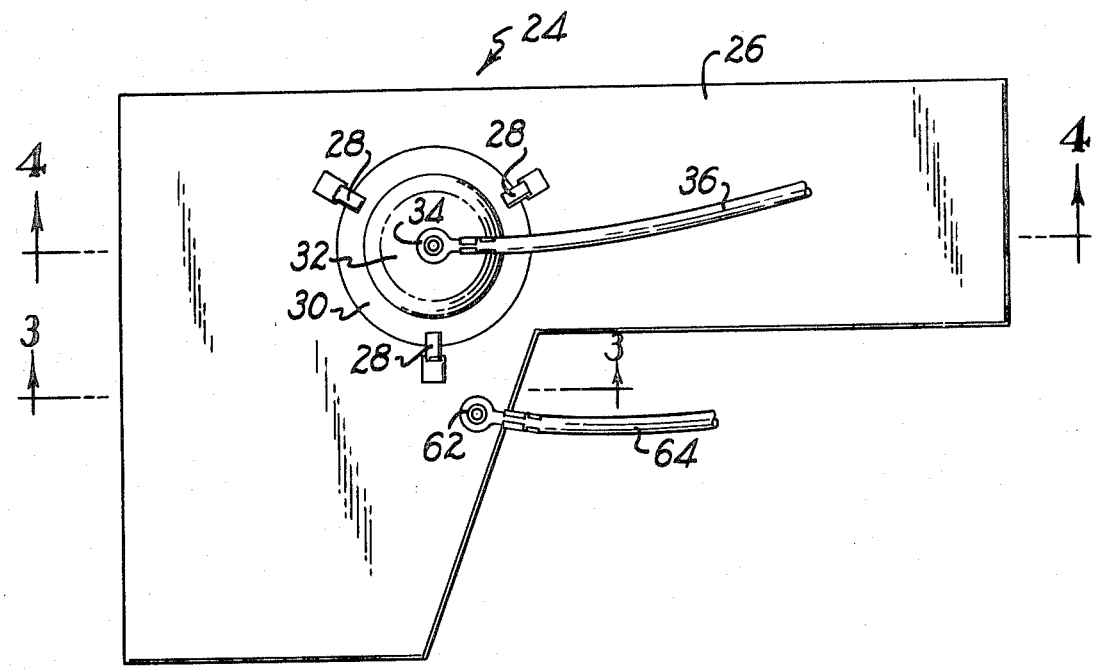
FIG. 2 is a top plan view of a heater unit of the preferred embodiment used in the FIG. 1 tray.
Figure 3:
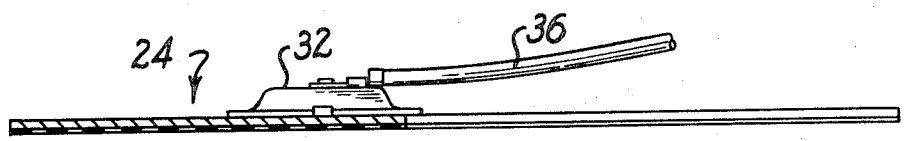
FIG. 3 is a cross sectional view taken on lines 3—3 of FIG. 2.
Figure 4:
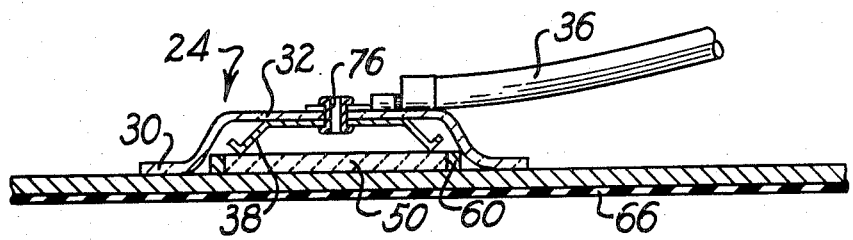
FIG. 4 is a cross sectional view taken on lines 4—4 of FIG. 2.

As seen in FIGS. 2–4, heater unit 24 employed in warmer 10 comprises a plate like member 26 formed of a highly thermally and electrically conductive material, such as aluminum. Tabs 28 are punched out of member 26 and clampingly engage a radially extending flange 30 of saucer shaped cover 32. Cover 32 is formed of thermally and electrically insulative material, such as fishpaper. Electrically conductive eyelet 34 is received in an aperture in cover 32 and mounts electrical lead 36 on the outer side of cover 32 and spring 38 on the inner side of the cover. Eyelet 34 is provided with an aperture 76 therethrough for a purpose to be described below.

Figure 6:
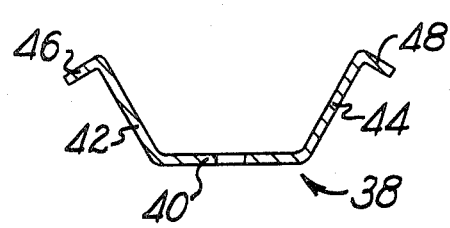
FIG. 6 is a front view of a spring member used to effect electrical connection with the wafer.

Spring 38 as seen in its unbiased shape in FIG. 6 is formed of electrically conductive material having good spring characteristics, such as beryllium copper and is generally U-shaped having a bight portion 40 with legs 42, 44 extending therefrom. The free distal end portions of legs 42, 44 are bent back upon themselves as indicated at 46, 48 respectively.

A wafer 50 of positive temperature coefficient of resistance material having a first relatively low resistance state at temperatures below an anomaly and a second relatively high resistance state at temperatures above an anomaly is employed as the heating element. It is preferred to use material having a low level of resistance in the first state in order to maximize the generation of heat through $I^2R$ heating until the wafer approaches its control or anomaly temperature. In order to self control and obviate the need of a thermostat, the PTC slope above the anomaly temperature must be very steep so that the resistance of the wafer will rise several orders of magnitude within just a few degrees of temperature. Such material is available, such as barium titanate doped with a rare earth (e.g. $Ba_{.997}La_{.003}TiO_3$). As used in the exemplary embodiment, wafer 50 is composed of PTC material having an anomaly temperature of 120° C. and resistance versus temperature characteristics as seen by curve 70 of FIG. 7 for an applied voltage of 120 A.C. Materials having other anomaly temperatures may be used as desired.

Figure 5:
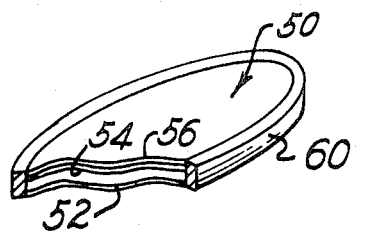
FIG. 5 is a pictorial view of a PTC wafer, partly broken away, used in the heating unit.

Wafer 50 is provided with electrically conductive coatings on first and second faces thereof. As seen in FIG. 5, a first face of wafer 50 is preferably provided with a single layer 52 which may be of aluminum applied for instance by flame spraying to obtain a good ohmic contact of high physical strength with the ceramic wafer. On the second opposite face another layer 54 of aluminum may be applied to wafer 50 in the same manner to achieve a good ohmic contact with high physical strength. A layer 56 of copper may be applied to layer 54 in any convenient way, as by flame spraying, to improve electrical connection with spring 38 which is biased against layer 54. Wafer 50 is secured to plate 26, as by cementing layer 52 using an electrically conductive adhesive. If plate 26 is made of copper, solder may be used in lieu of the electrically conductive adhesive.

As seen in FIG. 4, cover 32 clamped to plate 26 causes spring 38 to be biased against wafer 50 into good electrical connection therewith.

In order to increase the effective electrical distance between the opposite faces of wafer 50 insulating material such as a heat shrinkable, electrically insulative ring 60 is applied as by shrinking about the periphery of the wafer.

It has been found that permitting circulation of air in and around the PTC wafer 50 tends to enhance maintenance of the PTC characteristics, therefore the aperture 76 in the eyelet 34 is provided for venting.

Eyelet 62 as seen in FIG. 2 may be provided in plate 26 to facilitate attachment of electrical lead 64 thereto. Leads 64 and 36 are connected to terminals 20, 22 respectively to complete a current path through the heater unit.

A layer of pressure sensitive adhesive such as acrylic is provided on a surface of plate 26 to facilitate attachment to tray 10 on the bottom wall of the tray on the side remote from the food holding surface. A sheet of release paper may conveniently be placed over the adhesive to be peeled off for installation. If the surface to be heated is of electrically insulative material, heater 24 can be attached directly thereto; however, if it is electrically conductive, a sheet of insulating material can be interposed between the surface and heater unit 24. As shown, plate 26 is so configured that it is coextensive with two of the three compartments so that one compartment can be used to hold food to be maintained in a cooled condition while food in the other two compartments is maintained at an elevated temperature.

Figure 7:
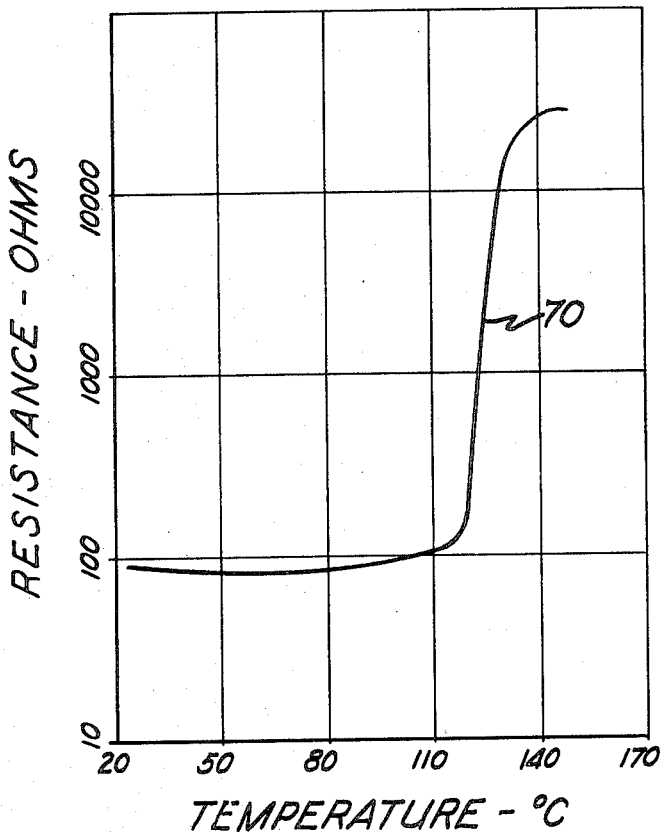
FIG. 7 is a graph of log resistance versus temperature of PTC wafer 50.
Figure 8A:
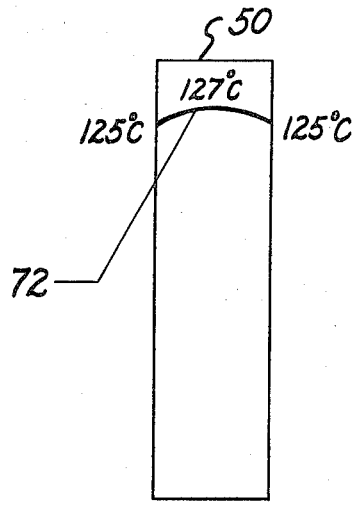
FIG. 8a is a temperature profile of a PTC wafer.
Figure 8B:
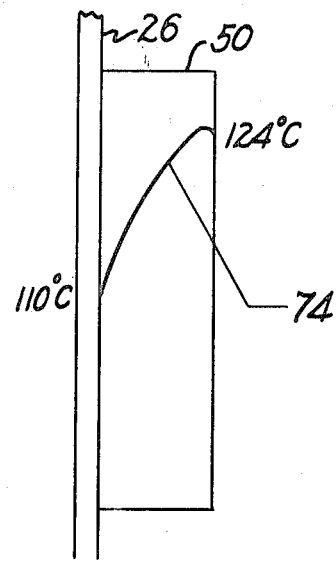
FIG. 8b is a temperature profile of a PTC wafer attached to a heat sink as used in the invention.

FIGS. 8a and 8b illustrate the effect the heat transfer plate 26 has on performance of the PTC wafer as a heater. FIG. 8a depicts the steady-state temperature profile 72 with an applied voltage of 120 A.C. plotted along the current path of PTC wafer 50 positioned vertically in room ambient. The internal heat builds up, the ceramic material being a poor thermal conductor as stated above, causing the temperature in the center of the element to rise. The center temperature is 2° C. higher than the surface temperature. Since the wafer operates at the steepest slope of the resistance-temperature curve, see curve 70, FIG. 7, that 2° C. difference results in a large resistance differential. This temperature rise in a thin section of the wafer virtually shuts off the power with a total generation of power of only 1.8 watts in the given example. However, the addition of heat transfer plate 26 changes the temperature distribution across the PTC wafer and greatly increases its heat generating capability. The addition of plate 26 causes the generation of power to be increased to 12.3 watts. As seen in FIG. 8b, profile 74, the cooling effect of the heat transfer plate 26 is readily seen with a temperature difference across the wafer of 14° C. Although there is a large temperature drop near plate 26, it occurs at temperatures below the anomaly where the slope is not steep, as seen in FIG. 7.

During the initial warm up period, it is important to efficiently conduct heat away from the PTC wafer to keep it operating below its switching (anomaly) temperature. High wattage output from a PTC heater can only be obtained when the heater operates in its low resistance mode. In order to optimize the efficiency of heating unit 24, wafer 50 is closely coupled to the food holding surface through plate 26 formed of material having low thermal resistance and low heat capacity and having a thickness which provides minimum lateral surface temperature drop and yet does not create lag due to its thermal mass. An example is a plate formed of aluminum approximately 0.03" thick.

Figure 9:
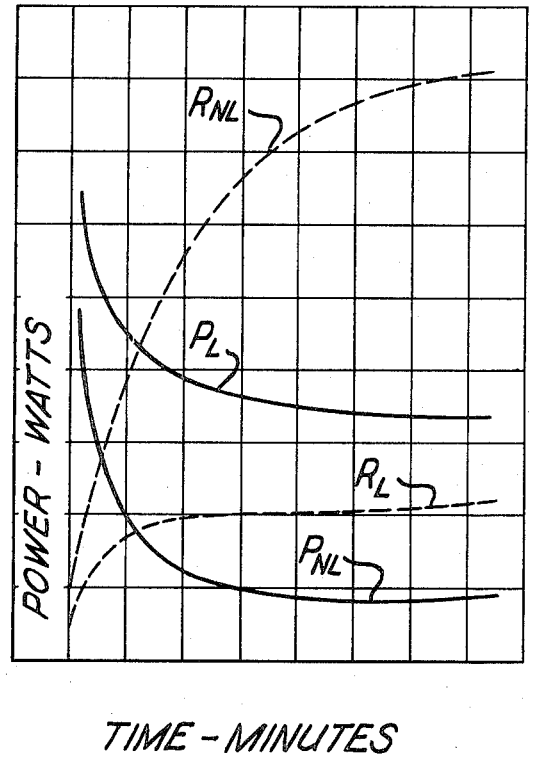
FIG. 9 is a graph showing performance curves of a PTC heater as used in the invention.

FIG. 9 illustrates the performance of the heater unit 24 as used in tray 10. It will be observed that there is a marked difference in power when there is food in the tray $P_L$ and when no food is in the tray $P_{NL}$. This large power difference results from only a small difference in the PTC wafer temperature. Under the loaded conditions (food in the tray), wafer 50 operates below its anomaly temperature but under no load conditions (no food in the tray), the operating point is above the anomaly temperature. The operating point refers to the equivalent resistance-temperature point on curve 70 of FIG. 7. Resistance of wafer 50 is shown in dotted lines for the loaded $R_L$ and unloaded $R_{NL}$ conditions.

Thus it will be seen that closely coupling a PTC wafer to a food holding surface through a heat transfer plate having low thermal resistance and low heat capacity as described above results in a food warming tray having superior operating characteristics.

As many changes could be made in the above constructions without departure from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

I claim:

1. Food warming apparatus comprising a food holding tray having a bottom wall defining a food holding surface, a plate like member formed of highly heat conductive and of low heat capacity material, the plate like member also being electrically conductive, a surface of the member adhesively attached to the bottom wall of the tray on a side of the wall remote from the food holding surface, a saucer shaped cover formed of electrically insulative material, the cover having a radially extending, annular flange at its periphery, a unit aperture centrally located in the cover, an eyelet received in the aperture and mounting an electrical lead on an outer side of the cover and an electrically conductive spring on an inner side of the cover, the spring being generally U-shaped having a bight portion and two legs extending therefrom, the bight portion connected to the eyelet, each leg having a free distal end portion bent back upon itself, a wafer of positive temperature coefficient of resistance material having first and second faces, an electrically conductive coating attached to the first and second faces, electrically conductive epoxy connecting the electrically conductive coating on the first face of the wafer to the plate like member, the saucer shaped cover placed over the wafer with the two spring legs contacting the coating on the second face of the wafer, a plurality of tabs formed from the plate like member, the tabs clampingly engaging the flange of the cover securing it to the member with the spring biased against the wafer in good electrical connection therewith and electrical connectors means to connect the electrical lead and the member to an electrical power source.

2. Apparatus according to claim 1 further including a ring of electrically insulative material placed about the periphery of the wafer.

3. Apparatus according to claim 1 in which the wafer is composed of doped barium titanate, the coating on the first face comprises a layer of aluminum, the coating on the second face comprises a layer of aluminum and a layer of copper, the aluminum layer being intermediate the wafer and the copper layer.

4. Apparatus according to claim 1 in which a plurality of food receiving compartments are defined in the tray, the plate like member essentially coextensive with at least two of the compartments.

5. Apparatus according to claim 1 in which said vent aperture is defined in the eyelet permitting air to circulate therethrough.

6. A heater assembly comprising a plate like member of highly heat conductive material, the member also being electrically conductive and of low heat capacity, a plurality of tabs formed in the member and bent out of the plane thereof, a saucer shaped cover of electrically and thermally insulative material, a radially extending annular flange at the periphery of the cover, a vent aperture defined in the cover, an eyelet received in the aperture and mounting an electrical lead on an outer side of the cover and an electrically conductive spring on an inner side of the cover, a wafer of positive temperature coefficient of resistance material having first and second faces, an electrically conductive coating attached to the first and second faces, the conductive coating of the first face permanently and electrically secured to the member, the cover located over the wafer with the tabs clampingly engaging the flange of the cover and the spring biased against the electrically conductive coating on the second face and electrical connectors to connect the electrical lead and the member to an electrical power source.

7. Apparatus according to claim 6 in which a ring of electrically insulative material is shrunk about the periphery of the wafer.

8. Apparatus according to claim 6 in which the spring is generally U-shaped having a bight portion with two legs extending therefrom, the bight portion is connected to the eyelet and the legs are biased against the electrically conductive coating on the second face of the wafer.

9. Apparatus according to claim 6 in which the wafer is composed of doped barium titanate, the coating on the first face comprises a layer of aluminum, the coating on the second face comprises a layer of aluminum and a layer of copper, the aluminum layer being intermediate the wafer and the copper layer.

10. Apparatus according to claim 9 in which said vent aperture is formed in the eyelet to permit circulation of air therethrough.

11. Apparatus according to claim 2 in which the aluminum is approximately .03" thick.

12. A heater assembly comprising a plate like member of highly heat conductive and of low heat capacity material, the member also being electrically conductive, a cover of electrically and thermally insulative material, an electrical lead and an electrically conductive spring mounted on the cover, a wafer of positive temperature coefficient of resistance material having first and second faces, an electrically conductive coating attached to the first and second faces, the conductive coating of the first face permanently and electrically secured to the member, attaching means mounting the cover over the wafer with the spring biased against the electrically conductive coating on the second face, a vent aperture defined in said cover and electrical connectors to connect the electrical lead and the member to an electrical power source.

References Cited

UNITED STATES PATENTS

| | | | |
|---|---|---|---|
| 3,219,480 | 11/1965 | Girard | 338—22 R X |
| 3,375,774 | 4/1968 | Fujimura et al. | 219—441 X |
| 3,381,115 | 4/1968 | Welch | 219—441 |
| 3,385,952 | 5/1968 | Mix | 219—387 |
| 3,489,976 | 1/1970 | Marcoux | 337—102 |
| 3,551,644 | 12/1970 | Sano et al. | 219—441 |
| 3,573,430 | 4/1971 | Eisler | 219—386 X |
| 3,674,983 | 7/1972 | Hurko | 219—462 |

VOLODYMYR Y. MAYEWSKY, Primary Examiner

U.S. Cl. X.R.

219—386, 439, 462, 540; 338—22 R